Dec. 2, 1958  A. E. POWELL  2,863,120
MAGNETOSTRICTIVE PULSE-TIME MODULATION
Filed Feb. 21, 1957  2 Sheets-Sheet 1
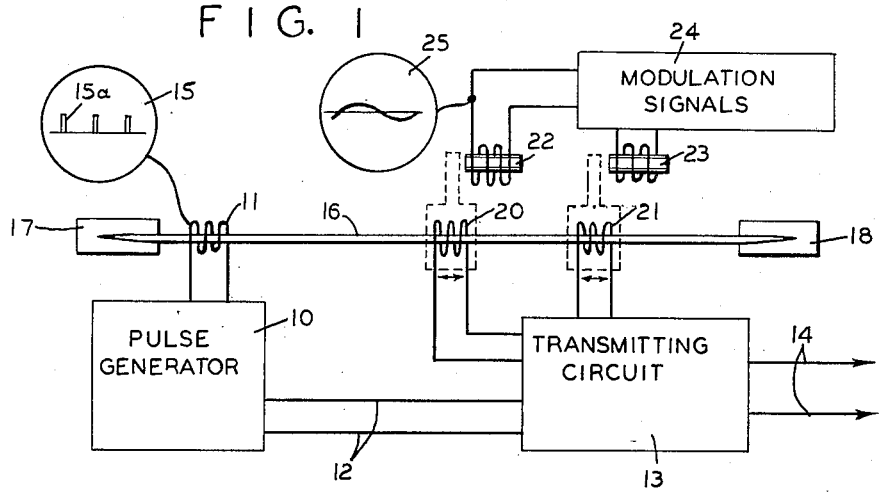
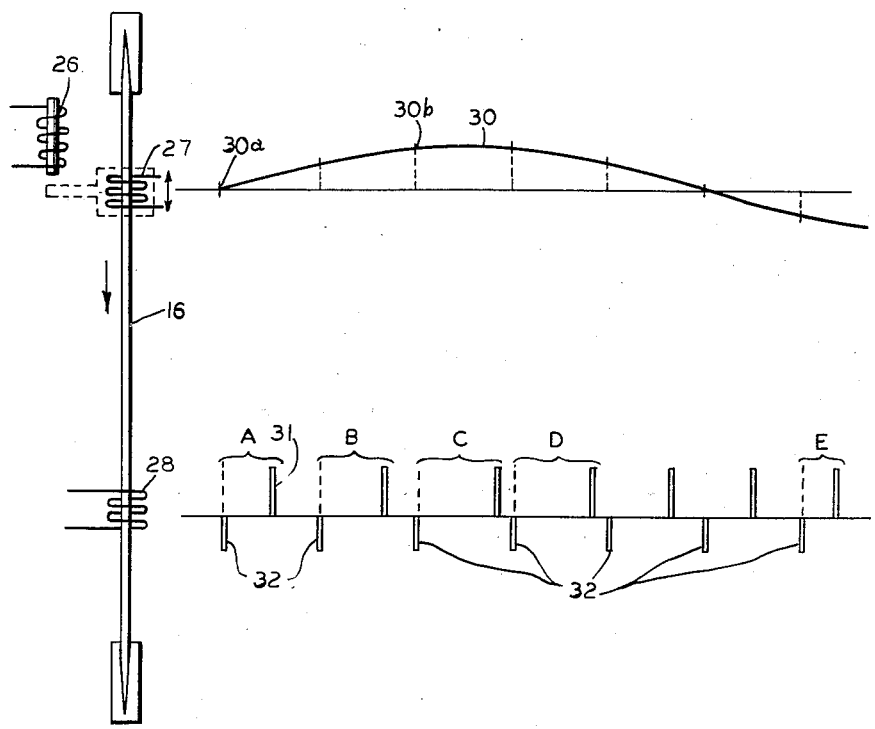
INVENTOR.
ALBERT E. POWELL
BY John P. Chandler
HIS ATTORNEY.

Dec. 2, 1958  A. E. POWELL  2,863,120
MAGNETOSTRICTIVE PULSE-TIME MODULATION
Filed Feb. 21, 1957  2 Sheets-Sheet 2

INVENTOR.
ALBERT E. POWELL
BY John P. Chandler
HIS ATTORNEY.

United States Patent Office 2,863,120
Patented Dec. 2, 1958

2,863,120

MAGNETOSTRICTIVE PULSE-TIME MODULATION

Albert E. Powell, Chatham, N. J., assignor to Byford Labs, Inc., Mamaroneck, N. Y., a corporation of New York Application February 21, 1957, Serial No. 641,506

6 Claims. (Cl. 332—9)

This invention relates to a magnetostrictive delay means for modulating a pulse in accordance with pulse-time modulation for conveying information from a transmitting station to a receiving station. The invention has particular reference to a system of pulse modulation which is responsive to the position of a modulating coil on a magnetostrictive transmission line.

As used throughout the specification and claims, the term "pulse-time modulation" refers to a system of modulation wherein the time delay of a transmitted pulse in reference to a basic synchronization pulse conveys the information desired to be transmitted. This information may be proportional to a static dimension, such as a pressure, temperature, or voltage, or it may be the instantaneous magnitude of a sine wave which forms part of a series of sounds.

Pulse-time modulation systems are old in the art and have been used in radar systems and in communication devices which transmit information from a robot plane or rocket to a ground receiving station. Values of pressure, temperature and speed can be transmitted on a single radio frequency using a plurality of pulse-time modulated waves. Systems which employed pulse-time modulation in the past have required many vacuum tubes and one or more electrical delay lines. Some systems also required one or more gating tubes for switching information circuits at the transmitter station in order to separate the synchronizing pulses from the delayed pulses. The present system requires no electrical delay line, no gating tubes, and no electrical circuits which require precise and accurate adjustments for their operation. A magnetostrictive delay line is employed with a transmitting coil adjacent one end of the line and a plurality of movable receiving coils spaced along the line for receiving and transmitting a series of pulses.

One of the objects of this invention is to provide an improved modulation system which avoids one or more of the disadvantages and limitations of prior art arrangements.

Another object of the invention is to produce a pulse-time modulation without the use of electrical delay lines.

Another object of the invention is to provide a pulse-time modulation arrangement which is inexpensive and reliable.

Another object of the invention is to provide a pulse-time modulator arrangement which can be easily multiplexed by including a plurality of modulating coils.

Another object of the invention is to eliminate electronic gating circuits at the transmitting circuit of a pulse-time modulator.

Another object of the invention is to produce efficient modulation of a series of pulses at D. C. modulation.

Still another object of the invention is to eliminate the modulated pulse when there is zero modulation.

Another object of the invention is to provide direct modulation of a pulse by mechanical controls such as temperature, pressure and length.

The invention comprises a magnetostrictive delay line composed of a nickel ribbon or a plurality of fine nickel wires arranged in a bundle. A transmitting coil is positioned in one end of the line and one or more movable modulating receiving coils are positioned along the line at various distances from the transmitting coil. The movable coils are moved in axial alignment to the line by the modulation signals and these coils are connected to a transmitting circuit which is coupled to an antenna, a wire transmitting line, or a radar system. A pulse is applied to the transmitting coil and to a portion of the transmitting circuit to provide a synchronizing signal at the receiving station. Transmission of the signal along the magnetostrictive delay line provides the delay which is necessary to convey the proper information to the receiving station and the movement of the modulating coils along the magnetostrictive line provides the necessary incremental delay for determination of the information at the receiving station.

For a better understanding of the present invention, together with other and further objects thereof, reference is made to the following description taken in connection with the accompanying drawings.

In the drawings:

Fig. 1 is a schematic diagram of connections, with some of the circuits in block, of the entire modulation system.

Fig. 2 is a schematic diagram of the delay line in connection with two graphs, one showing a modulation wave and the other showing the resultant pulse modulation signals.

Figure 3:
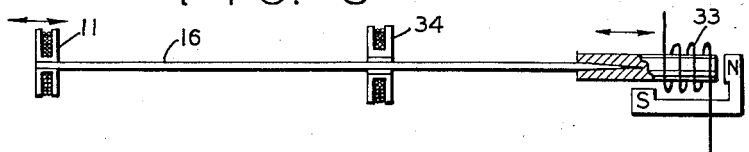
Fig. 3 is a diagram showing an alternate arrangement of the modulating device wherein the magnetostrictive line and the transmitting coil are vibrated in accordance with the modulation signal.

Referring now to the diagram in Fig. 1, a pulse generator 10 is shown which is coupled to a transmitting coil 11 and at the same time transmits the same kind of pulse over conductors 12 to a transmitting circuit 13. This transmitting circuit is connected by conductors 14 to a transmitting system (not shown) which may be an antenna or a wire transmitting line which transmits information to a distant point.

Pulse generator 10 transmits pulses which are indicated graphically in the circle 15, these pulses being equally spaced and occurring about five times the rate of the highest frequency of the modulation signal. Coil 11 is positioned around a magnetostrictive delay line 16 which may consist of a nickel rod or ribbon or may be made up of a plurality of fine wires. At each end of the line the line absorbing masses 17 and 18 are positioned around the feathered edges of the line to absorb the transmitted energy and prevent reflection, such absorbing masses being well-known in the art.

One or more receiving coils 20, 21 are spaced apart from the transmitting coil 11 and surround the line 16 in a manner similar to the transmitting coil 11. Each receiving coil is movable in a direction which is parallel to the line 16 and is controlled in its movement by a controlling device which may be a simple mechanical linkage or, as shown in Fig. 1, an electromechanical transducer 22 or 23. The transducers as indicated receive their energy from a source of modulation signals 24. This source may be an amplifier which amplifies voice frequencies obtained from a microphone or a transmission line or it may be any other electrical source which produces electrical vibrations which are to be transmitted by the pulse-time modulating arrangement. The graph in circle 25 indicates a low frequency wave which may be applied to transducer 22.

The operation of this circuit is as follows: A synchronizing pulse, such as that indicated at 15a is transmitted simultaneously to coil 11 and over conductors 12 to circuit 13. The pulse transmitted over conductors 12 is sent out immediately over conductors 14 to the distant station. The pulse applied to coil 11 produces a mechanical disturbance in line 16 which travels from the coil 11 toward coils 20 and 21 at the speed of sound within the nickel. A few microseconds later the pulse passes through coil 20 and in doing so creates a small electrical pulse in the coil which is applied to transmitting circuit 13 and, after being amplified, is transmitted over conductors 14 to the antenna or distant station.

If coil 20 is moved by transducer 22 to the right away from the transmitting coil 11 it will be obvious that the sound pulse in line 16 will be picked up later than if the coil 20 had been moved to the left. It is apparent that the mechanical movement of coil 20 alters the time delay of the pulse which is transmitted from coil 11 and this time delay will bear a similar time delay characteristic compared to the synchronizing pulse transmitted over conductors 12. After the pulse passes through coil 20 it continues to coil 21 whose position along the line 16 is varied by transducer 23. Coil 21 also generates a current pulse which is transmitted to transmitting circuit 13 in a similar manner to the pulse from coil 20 and this second pulse may be amplified as before and sent out over conductors 14.

The diagram shown in Fig. 2 further explains the action of the magnetostrictive delay device. In this arrangement the modulation signal is applied to transducer coil 26 which moves transmitting coil 27 and sends a pulse down the delay line 16 to the receiving coil 28 which in this embodiment is held stationary. The movement of the transmitting coil 27 is indicated by the low frequency sine wave 30 drawn at right angles to line 16. The pulses generated in receiving coil 28 are indicated by positive pulses 31 in a graph drawn perpendicular to line 16 at the receiving coil. For reference, the position of the synchronizing pulses 32 are shown below the line but it must be remembered that these pulses are not present in coil 28 and are shown only to indicate the variable time delay produced. The first pulse 32 is sent over line 16 when the transmitting coil 27 is in its zero position as indicated by the point 30a and the pulse then travels down the line to receiving coil 28 in a time which is indicated by the distance A. The third pulse is transmitted from coil 27 when the coil is in a position indicated by the point 30b and the time consumed by the pulse in going between coils is indicated by the distance C, this distance being longer than the distance A and responsive to the position of coil 27. In a similar manner the other distances indicated, B, D and E, are all responsive to the amplitude of the modulating wave 30. The result is a pulse-time modulation system which can be sent out over a transmission line or used to modulate a carrier frequency which may be radiated from an antenna.

Fig. 3 shows an alternate arrangement wherein the transmitting coil 11 is secured to the end of the magnetostrictive line and the two are moved together by means of a modulating coil 33. In this arrangement the receiving coil 34 remains fixed. The result is the same, the same character of pulses and pulse spacings are produced as indicated at the bottom portion of Fig. 2.

Figure 4:
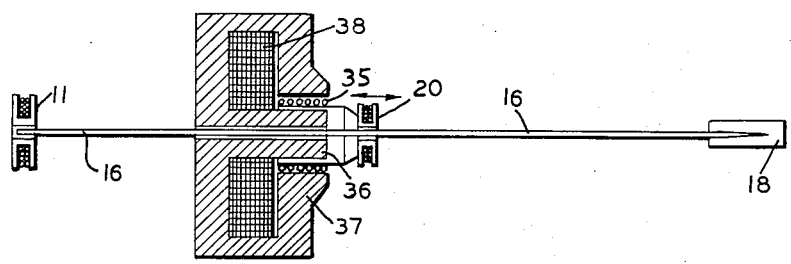
Fig. 4 is a detailed cross sectional view showing a stationary transmitting coil, a stationary magnetostrictive delay line, and a movable receiving coil, moved along the line by a transducer similar to the motor employed in present day moving-coil loud speakers.

Fig. 4 shows how the preferred system, as indicated schematically in Fig. 1, may be put into operation. The transmitting coil 11 is fixed as is the delay line 16. The transmitting coil is positioned at the extreme end of line 16 in order to eliminate reflections from that end of the line. The receiving coil 20 is mounted on a support which is part of the moving coil 35 of a transducer which includes a central magnetic pole 36, an annular magnetic pole 37 of opposite polarity, and a direct current winding 38 which generates the magnetic flux necessary to produce motion of coil 35 when a modulating current is applied thereto. The central portion 36 contains a longitudinal hole through which the magnetostrictive line 16 extends. A modulating current applied to winding 35 moves coil 20 along line 16 as described above and produces the time modulation of pulses transmitted from coil 11 necessary to convey information to a transmitting circuit. It will be obvious that a number of such motor units may be placed along a line 16 for multiplex operation.

Figure 5:
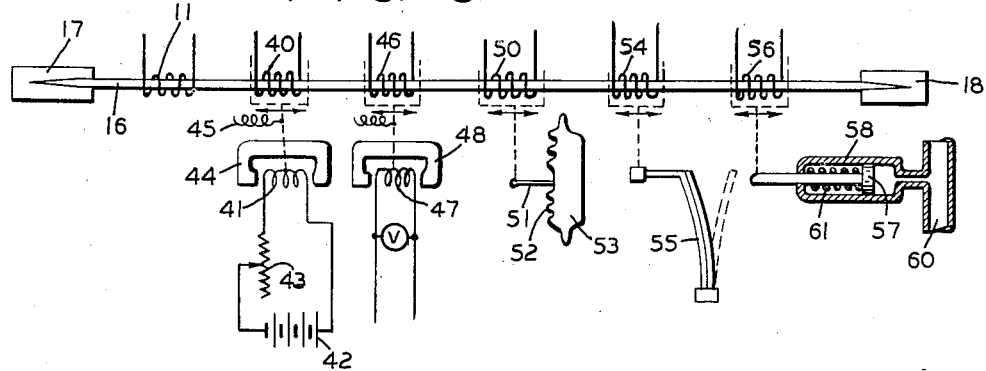
Fig. 5 is a schematic diagram showing a single transmitting coil and five receiving coils all coupled to a magnetostrictive delay line, indicating how various types of information may be transmitted in multiplex arrangements by the use of a signal line.

Fig. 5 illustrates how a large number of receiving coils may be employed on a single line 16 to transmit a large variety of information to a transmitting circuit. The line 16 is terminated by non-reflecting masses 17 and 18 as before and a transmitting coil 11 is placed near one end of the line. Five receiving coils are positioned in spaced relation to the transmitting coil as indicated, one of such coils 40 being moved by a motor winding 41 which is actuated by a battery 42 and a variable resistor 43. Motion of coil 41 is produced by a permanent magnet 44 whose flux lines pass through the center of the coil. A spring 45 may be used in order to provide a return force for coil 40 depending on the type of motor used. Such a system can be employed to transmit the position of the contact on resistor 43, it being assumed that this contact is moved by some other mechanism whose position represents the information to be transmitted.

A second coil 46 is mounted in a manner similar to coil 40 and is moved by another coil 47 controlled by a magnet 48. Such an arrangement may be used to transmit the value of a voltage which is applied to coil 47. A third coil 50 is coupled to a central stud 51 which is secured to the center of a diaphragm 52 which is the moving part of an aneroid barometer 53. This system will transmit values proportional to atmospheric pressure. A fourth coil 54 is coupled to the end of a bi-metallic strip 55 and in a similar manner may be used to provide time modulation of a transmitted pulse which is proportional to the temperature of the strip. A fifth coil 56 is coupled to a plunger 57 in a cylinder 58 which is connected to a pipe 60 containing a liquid or gas under pressure. In this case a helical spring 61 is employed to act against the pressure in the pipe, the resultant position of plunger 57 being a function of the pressure. Coil 56 produces a pulse modulation which is proportional to the pressure in pipe 60.

Figure 6:
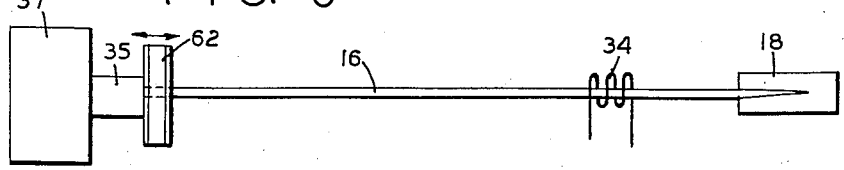
Fig. 6 is an alternate arrangement wherein the magnetostrictive line and the receiving coil are fixed and the transmitting coil is moved at the end of the line to transmit pulses only when a modulation is being transmitted.

Fig. 6 shows an alternate arrangement of producing a pulse-time modulation and comprises a transmitting coil 62 coupled to a motor unit 37 by means of a moving coil 35 similar to that shown in Fig. 4. The transmitting coil 62 is mounted just off the end of the magnetostrictive line 16 which passes through a receiving coil 34 and is terminated by a non-reflecting mass 18. When there is no modulation coil 62 produces no signal whatever in the line and none is received by coil 34. When a modulation signal is received, coil 62 is moved toward the end of the line and pulses are delivered to the line and to coil 34. If the modulating signal comprises an alternating wave, only the positive (or negative) parts of the wave will be transmitted to line 16. It is contemplated that a system such as this will be employed in cases where only one portion of a wave is to be transmitted or in which non-oscillating values such as temperature or pressure are to be transmitted.

It will be obvious from the above description that such a modulation system can be employed to send information from a transmitting circuit to a receiving station which is simple, accurate and requires very little apparatus.

While there have been described and illustrated specific embodiments of the invention, it will be obvious that changes can be made in the means for moving the transmitting or receiving coils and that various methods of coupling may be used between the moving coils and the apparatus which contains the information to be transmitted. The invention should be limited only by the scope of the appended claims.

What I claim is:

1. A modulator of the class described comprising a magnetostrictive system including a transmitting winding connected to a generator which produces a train of electrical pulses, a receiving winding connected to a transmitting circuit for transmitting a train of received pulses, a magnetostrictive line magnetically coupled to both of said windings, and a modulation transducer secured to one of said windings, said transducer adapted to produce a vibrating movement of the winding along said line.

2. A modulator of the class described comprising a magnetostrictive system including a transmitting winding connected to a generator which produces a train of electrical pulses, a receiving winding connected to a transmitting circuit for transmitting a train of received pulses, a magnetostrictive line magnetically coupled to both of said windings, and a modulation transducer secured to one of said windings and coupled to an external source for receiving a modulation signal, said transducer adapted to produce a vibrating movement of the winding along said line, said movement responsive to the amplitude and frequency of the modulation signal.

3. A modulator of the class described comprising a magnetostrictive system including a transmitting winding connected to a generator which produces a train of spaced electrical pulses, a receiving winding connected to a transmitting circuit for transmitting a train of received pulses, a magnetostrictive line magnetically coupled to both of said windings and adapted to transfer a pulse from said transmitting winding to said receiving winding, and a modulation transducer mechanically coupled to one of said windings and electrically connected to an external source for receiving a modulation signal, said transducer adapted to produce a vibrating movement of one of said windings along said line to vary the distance between windings, said distance variation being proportional to the amplitude of the modulation signal and producting variable time intervals between said pulses generated in the receiving winding.

4. A pulse modulator for changing the time intervals between spaced electrical pulses comprising, a magnetostrictive line, a transmitting winding coupled to the line and connected to a pulse generator which produces a series of equally spaced pulses, a receiving winding coupled to the line and connected to a transmitting circuit, and a modulation transducer mechanically coupled to one of said windings and adapted to vary the distance between the windings in accordance with the amplitude of a modulation signal.

5. A pulse modulator for changing the time intervals between spaced electrical pulses comprising, a magnetostrictive line, a transmitting winding coupled to the line and connected to a pulse generator which produces a sequence of recurrent pulses separated by equal time intervals, a receiving winding coupled to the line and connected to a transmitting circuit, and a modulation transducer mechanically coupled to one of said windings and adapted to vary the distance between the windings for varying said time intervals, said variable time intervals being proportional to a modulation signal applied to said transducer.

6. A pulse modulator for changing the time intervals between spaced electrical pulses comprising, a magnetostrictive line, a transmitting winding coupled to the line and connected to a pulse generator which produces a sequence of recurrent pulses separated by equal time intervals, a plurality of receiving windings coupled to the line and connected to a transmitting circuit, and a plurality of modulation transducers each mechanically coupled to a receiving winding and adapted to vary the distances between the receiving winding and the transmitting winding, said distance variations producing variable time intervals between transmitted pulses.

References Cited in the file of this patent

UNITED STATES PATENTS

| | | |
|---|---|---|
| 2,247,941 | Crosby | July 1, 1941 |
| 2,455,740 | Curtis | Dec. 7, 1948 |
| 2,467,793 | Wheeler | Apr. 19, 1949 |
| 2,495,740 | Labin et al. | Jan. 31, 1950 |